United States Patent [19]

Carter et al.

[11] 3,754,637
[45] Aug. 28, 1973

[54] CLAMPING MEANS FOR CONTAINER LABELING AND STRIP-APPLYING APPARATUS

[75] Inventors: Sidney T. Carter, Shrewsbury; Florian J. Jolda, East Douglas, both of Mass.

[73] Assignee: A-T-O Inc., Cleveland, Ohio

[22] Filed: Feb. 12, 1971

[21] Appl. No.: 114,952

[52] U.S. Cl.................................. 198/179, 198/165
[51] Int. Cl............................................ B65g 19/00
[58] Field of Search..................... 198/179, 210, 165

[56] References Cited
UNITED STATES PATENTS
2,908,414  10/1959  Fairest et al.................... 198/179 X
2,822,653  2/1958   Zinn et al. ...................... 198/179 X Primary Examiner—Evon C. Blunk
Assistant Examiner—Douglas D. Watts
Attorney—Roberts, Cushman & Grover

[57] ABSTRACT

The combination with apparatus for applying labels to the sides of containers and an apparatus for applying sealing strips to the tops of containers; of a clamp-carrying conveyor supported in parallel relation to an extension of a container-conveyor extending from the apparatus for applying labels through the apparatus for applying sealing strips and pivotally mounted, spaced pairs of clamping jaws on the clamp-carrying conveyor adapted to be brought successively into engagement with the containers before they leave the label-applying apparatus and while still held at the spacing and in the orientation imparted thereto by the spacing and spotting mechanism in the labeling apparatus and to move with the container-conveyor toward the sealing strip-applying apparatus to maintain the spacing and orientation of the containers during their movement from the labeling apparatus to the sealing strip-applying apparatus thereby to eliminate the need for additional spacing and spotting mechanism in conjunction with the sealing strip-applying apparatus and to shorten the overall length of the combined apparatus.

4 Claims, 7 Drawing Figures

Patented Aug. 28, 1973

INVENTORS
SIDNEY T. CARTER
FLORIAN J. JOLDA
BY Roberts, Cushman & Grover
ATT'YS

CLAMPING MEANS FOR CONTAINER LABELING AND STRIP-APPLYING APPARATUS

BACKGROUND OF THE INVENTION

In the usual labeling apparatus there is a conveyor for moving containers relative to the label-applying mechanism and to insure affixing the labels to all of the containers in the same relative position there is provided feeding means for uniformly arranging the containers at a predetermined spacing, spotting means for orienting the containers to present the same portion of each container to the labeling mechanism, and means for maintaining the containers at the aforesaid spacing and in said positions of orientation throughout movement through the labeler. Correspondingly, spacing and spotting means are employed in conjunction with apparatus for applying sealing strips, for example, tax stamps to the tops of containers. It is the purpose of this invention to combine the labeling and sealing strip-applying apparatus in such fashion as to maintain the spacing and spotting imparted to the containers while in the labeling machine as they move from the labeling apparatus to the sealing strip-applying apparatus, hence to eliminate the need for additional spacing and spotting mechanism and also to shorten the overall length of the combined apparatus. Further objects are to provide an apparatus designed to be used with labeling and sealing strip-applying apparatus to fix the spacing and the orientation of the containers while still under the control of the labeling apparatus to enable accurately applying sealing strips to the tops of the containers in a specific relation to the previously applied labels; to provide apparatus for carrying out this operation automatically and expeditiously; and to provide apparatus which enables easily interchanging parts to adapt it for containers of different size and/or configuration.

SUMMARY

As herein illustrated, apparatus for applying lables to the sides of containers and apparatus for applying sealing strips, for example tax stamps to the tops of containes, are arranged adjacent each other with the conveyor by means of which the containers are moved through the labeling apparatus, extending therefrom to and beyond the apparatus for applying the sealing strips to the tops of the containers. The label-applying apparatus is provided with means for spacing and spotting the containers for labeling and with means for maintaining the aforesaid spacing. It is the purpose of this invention to take advantage of the spacing and spotting imparted to the containers in the labeling apparatus by preserving it while the containers are travelling from the labeling apparatus to the sealing strip-applying apparatus, thereby to eliminate the necessity of providing additional spacing and spotting mechanism for the sealing strip-applying apparatus. This is achieved herein by employing clamping means movable in synchronism with the movement of the container-conveyor and operation of the sealing strip-applying apparatus for clamping the containers as they leave the label-applying apparatus and before they have been released therefrom. The clamping means comprises pairs of jaws mounted at a predetermined spacing on an endless clamp-carrying conveyor supported with one run parallel to the container-conveyor by means of which the jaws are moved successively into clamping engagement with the containers at the labeling apparatus and thereafter moved along with the container-conveyor to the sealing strip-applying apparatus. The jaws of the clamping means clamp the containers fore and aft, and not only fix the spacing between the containers and their orientation, but also fix their position laterally as they travel along with the container-conveyor. The jaws are yieldably supported to accommodate containers of different size and/or shape, and are removably mounted on the clamp-carrying conveyor to enable interchanging jaws when desirable.

The invention will now be described in greater detail with reference to the accompanying drawings wherein:

FIG. 1 is a fragmentary elevation of apparatus for applying sealing strips to the tops of containers, illustrating a conveyor for moving containers from a labeling apparatus, preceding the sealing strip-applying apparatus for application of the sealing strips to the tops and from thence to accessory apparatus for squeezing the end portions of the sealing strip into engagement with the sides of the containers, and showing the novel container-clamping means for transferring the containers from the label-applying apparatus to the sealing strip-applying apparatus and from thence to the sealing strip squeezing apparatus;

Figure 7:
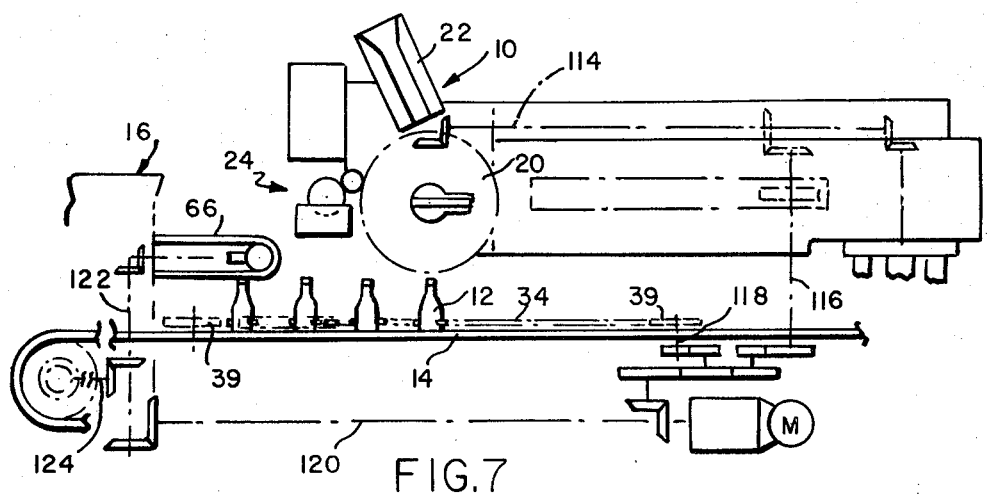
FIG. 7 diagrammatically illustrates the driving means for synchronizing the movement of the clamping means with the preceding labeling apparatus and with the sealing strip-applying apparatus.

Referring to the drawings (FIGS. 1 and 7) there is shown sealing strip-affixing apparatus 10 to which containers 12 are delivered by a container-conveyor 14 from labeling apparatus 16 for application of sealing strips to the tops of the containers and from which the containers with the sealing strips affixed thereto are moved to ancillary means 18 for squeezing the end portions of the sealing strips to the sides of the containers. The sealing strip-affixing apparatus 10 is the subject matter of copending application Ser. No. 78,652, filed Oct. 7, 1970, and briefly embodies a sealing strip-applying wheel 20 rotatable relative to a sealing strip-holding magazine 22 and adhesive-applying means 24 supported peripherally thereof for removing a seaing strip from the magazine 22, applying adhesive thereto and then affixing it to the top of a container resting on the conveyor 14. There are peripherally spaced grippers 26 on the wheel for carrying the sealing strips from the magazine 22 to the adhesive-applying means 24 and from thence to a position for application to the containers, and there are peripherally spaced sealing strip spotting and holding assemblies 28 on the wheel for applying the sealing strips to the tops of containers situated on the container-conveyor 14 below the wheel.

Labeling apparatus are provided with spacing and spotting means for arranging the containers on the container-conveyor by means of which the containers are moved through the labeling apparatus at a predetermined spacing preparatory to application of the labels thereto and means for turning the containers with reference to their vertical axes so that the labels will be applied to predetermined like areas of all of the containers. After labeling the containers are delivered to apparatus for applying sealing strips to the tops thereof, for example, tax stamps, by an extension of the conveyor on which the containers are moved through the labeling apparatus and it is the purpose of this invention to provide means for preserving the spacing and orientation of the containers while moving along with the extension of the container-conveyor to the apparatus for applying the sealing strips so that additional spacing and spotting devices are not required.

In U. S. Pat. No. 2,940,630, for Labeling Machines, the spacing and orientation imparted to the containers for the purpose of labeling is maintained while in the labeler by an endless belt 66 (FIG. 1) which has contact with the tops of the containers. In accordance with this invention, to provide for maintaining the spacing and orientation of the containers imparted thereto by the labeler, clamping means 30 (FIGS. 1 and 2) is provided which operates in conjunction with the endless belt 66 on the labeler for clamping the containers before they are released from the labeling apparatus and moving with the container-conveyor to transfer them at the aforesaid spacing and orientation to the apparatus 10 for applying sealing strips thereto.

Figure 2:
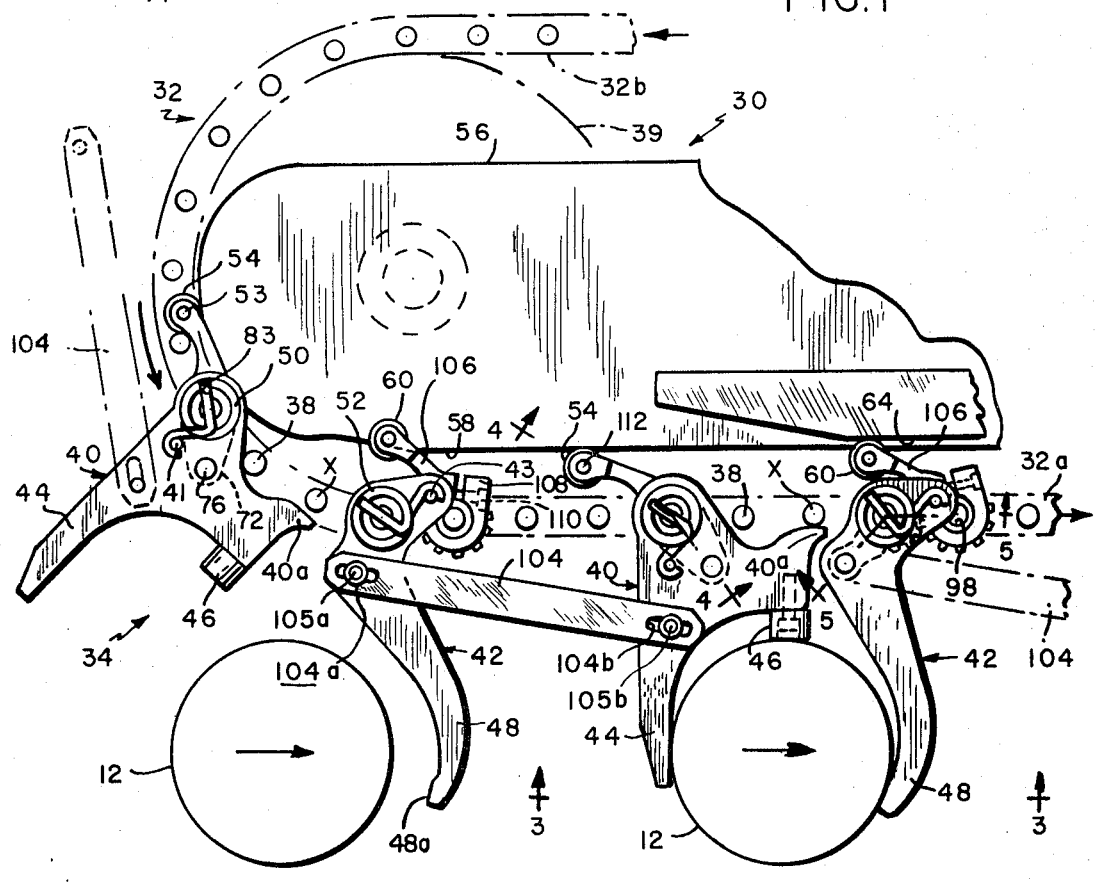
FIG. 2 is a fragmentary plan view at one end of the container-clamping means showing one pair of jaws engaged with a container of circular cross-section and a succeeding pair of jaws moving into position for clamping.
Figure 3:
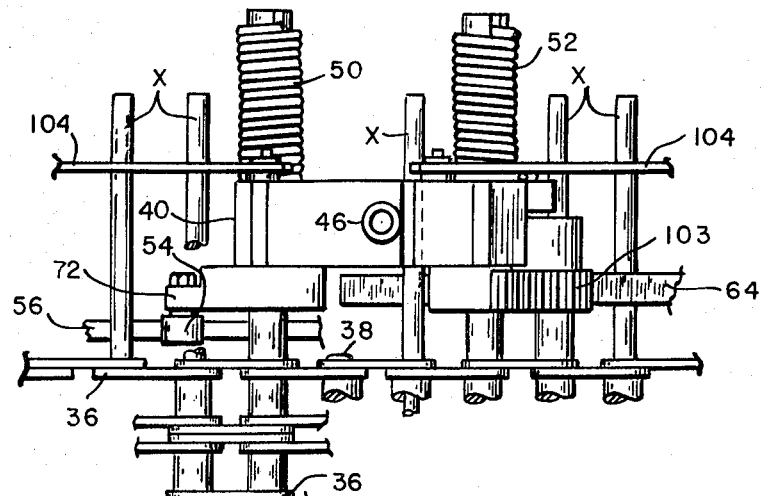
FIG. 3 is a fragmentary elevation taken in the direction of the arrow 3—3 of FIG. 2.

The clamping means 30, as shown in FIG. 2, comprises an endless clamp-carrying conveyor 32 in the form of a link chain (FIG. 3) on which are mounted pairs of jaws 34 which extend laterally from the chain in a horizontal plane above and substantially parallel to the container-conveyor 14 on which the containers rest. The chain comprising the clamp-carrying conveyor 32 is of double-link construction (FIG. 3), the links 36 being pivotally connected by pins 38 and extensions x to provide for rigidity and is mounted on edge with the axes of the pins perpendicular with respect to the plane of the container-conveyor 14 on longitudinally spaced sprocket wheels 39—39 (FIG. 7), so that one end is adjacent the labeling apparatus 16 and the other is adjacent the stamp-squeezing means 18. The clamp-carrying conveyor 32 (FIG. 2) has oppositely travelling, longitudinally extending sides 32a and 32b, the side 32a travelling from the labeling apparatus to the squeezing means 18 and the side 32b travelling in the opposite direction from the squeezing means 18 to the labeling apparatus 16. The side 32a is parallel to the container-conveyor 14.

Each pair of jaws 34 (FIGS. 2 and 6) comprises a jaw 40 and a jaw 42 pivotally mounted on the clamp-carrying conveyor 32 on vertical extensions x of the pins 38 so that when moving along the side adjacent the container-conveyor they project laterally therefrom over the container-conveyor in spaced parallel relation thereto. As will appear hereinafter, the jaws are supported in spaced confronting relation to each other for movement toward each other from a spread-apart position to admit a container between them to a position of clamping engagement with the container. The confronting sides of the jaws are provided with a configuration which is suitable for clmaping engagement with the containers being processed according to shape and may be provided with adapters as will appear hereinafter for this purpose.

As illustrated (FIG. 2), the clamping jaws 40 and 42 are designed for clamping bottles of circular horizontal section. The jaw 40 is provided with a finger 44 for engagement with the rear side of a container resting on the container-conveyor by means of which the container is maintained at its predetermined position on the container-conveyor relative to the sealing strip-applying apparatus and moved forwardly and a positioning block 46 for engagement with the side of the container next to the clamp-carrying conveyor which maintains the container at a predetermined position transversely of the container-conveyor, specifically with its axis centered with respect to the sealing strip-applying apparatus so that the sealing strip will be properly centered with respect to the top of the container when it arrives at the sealing strip-applying apparatus for application of the sealing strip thereto. The jaw 42 is provided with a finger 48 having an end 48a for engagement with the forward side of the container at an angular distance from the block 46 which is greater than the right angle so that when clamped against the container it holds the container firmly in engagement with both the finger 44 and the block 46.

Figure 6:
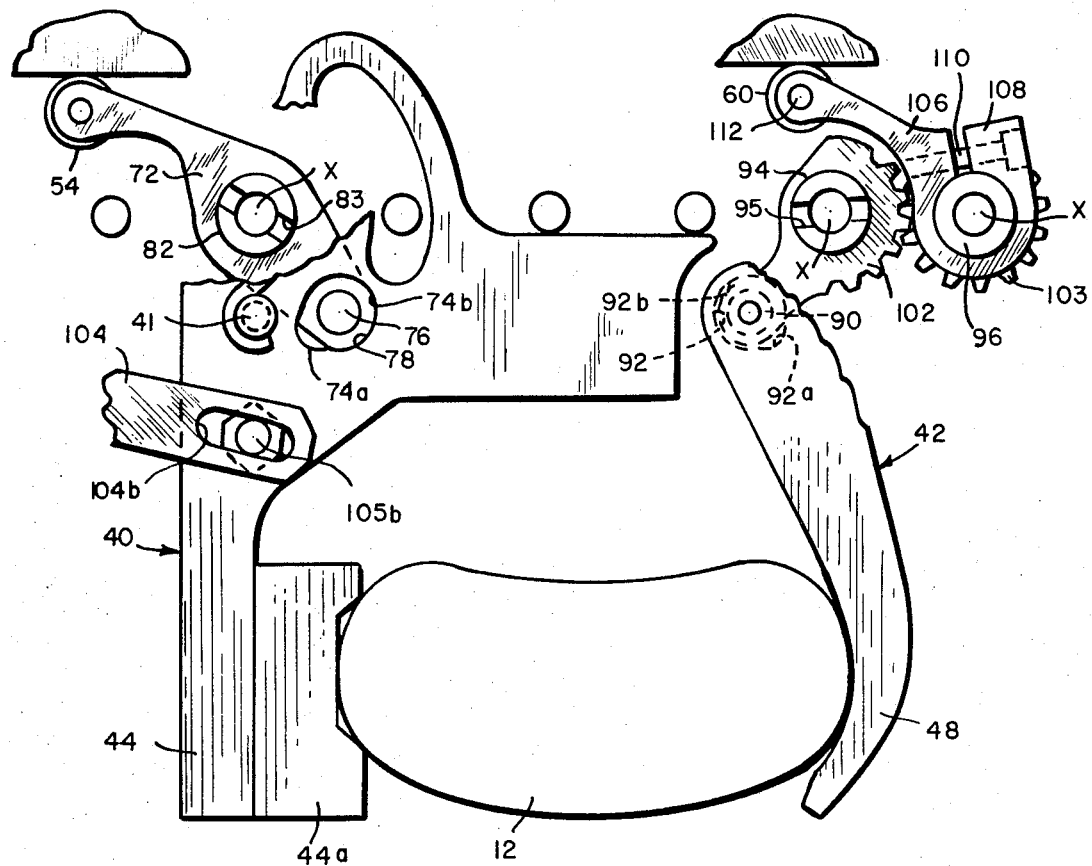
FIG. 6 is an elevation of the jaws and jaw-supporting and operating mechanism, to larger scale, broken away in part, and also showing an adapter for clamping a flask-type container.

FIG. 6 shows the finger 44 provided with an adapter 44a for accommodating a flask-type container. Adapters may also be attached to the finger 48 and/or to other parts of both fingers to accommodate them to containers of different size and configuration.

Figure 4:
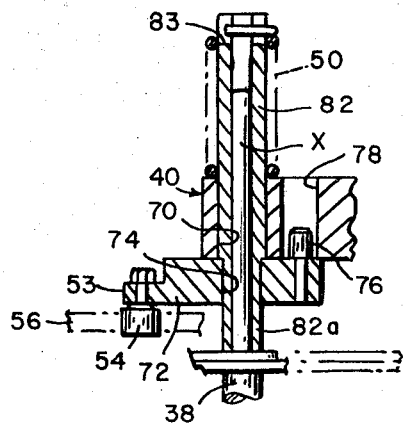
FIG. 4 is a fragmentary vertical section taken on the line 4—4 of FIG. 2.
Figure 5:
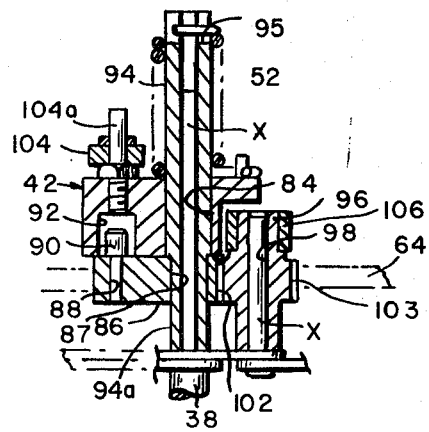
FIG. 5 is a fragmentary vertical section taken on the line 5—5 of FIG. 2.

The jaws 40 and 42, as previously indicated, are pivotally supported by the clamp-carrying conveyor 32 and biased toward each other by oppositely stressed springs 50 and 52 (FIGS. 3, 4 and 5), the purpose of which is to enable yieldably clamping the jaws against the container so as to conform to the contour of the container and to compensate for irregularities therein. As the jaws 40, 42 of a pair of jaws are moved around the sprocket 39 at the left end (FIG. 2) of the container-conveyor 14 the jaw 42 approaches the forward side 32a of the clamp-carrying conveyor 32 ahead of the jaw 40 and is disposed across the container-conveyor ahead of the forward side of the container about to be clamped. The jaw 42 at this location is under the control of a link 104 which is pivotally connected at one end to the jaw 42 of the pair of jaws and at its opposite end to the jaw 40 of the preceding pair of jaws. At this time the following jaw 40 is still on the curve at the end of the clamp-carrying conveyor 32 and so is laterally displaced therefrom and will thus permit a container to move by it into confronting relation to the jaw 42. As the jaws 40 and 42 continue to travel they are moved successively into clamping engagement with the container by engagement of cam followers 54 and 60 with cams 58 and 64 on the cam plate 56. Movement of the jar 40 toward the jaw 42 is limited to a fixed position determined by engagement of a tooth 40a with an extension x of one of the pins connecting the links of the chain. The cam follower 54, by engagement with the cam 58, prior to movement of the cam follower 60 into engagement with the cam 64, determines the position of the jaw 40 and hence the container on the container-conveyor. The jaw 42, by engagement of its cam follower 60 with the cam 64, is moved rearwardly toward the jaw 40 to yieldingly clamp the container against the jaw 40.

Figure 1:
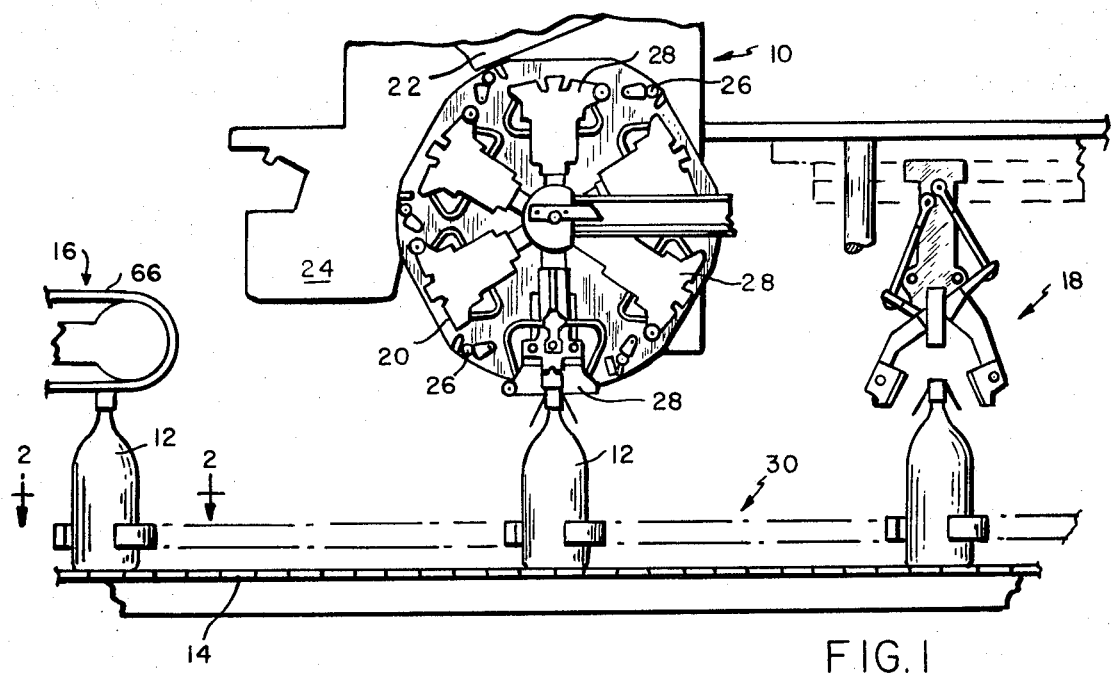

As related above, it is desirable to effect clamping of the jaws with the container before the container leaves the labeling apparatus and specifically before the top of the container, as shown in FIG. 1, is released from engagement with the container hold-down belt 66 of the labeling apparatus. The left end of the clamp-carrying conveyor 32 supporting the jaws is accordingly so located with respect to the container hold-down belt 66 (FIGS. 1 and 6) that the jaws 40 and 42 will come together about the base of the container, as shown in FIG. 1, into clamping engagement therewith, as shown in FIG. 2, before the top of the container escapes from the underside of the belt 66. The containers are released from the jaws as the latter travel around the sprocket 39 at the right end of the clamp-carrying conveyor.

The jaws 40 and 42, as previously mentioned, are removably mounted on the chain of the clamp-carrying conveyor 32 so that they may be easily and quickly removed and replaced with jaws of a different size and/or configuration for different size and different shape containers in the event that adapters do not suffice.

As illustrated (FIG. 4), the jaw 40 contains a vertically disposed hole 70 and is mounted on a sleeve-like bushing 82 which, in turn, is mounted on an extension $x$. An arm 72 containing a vertically disposed hole 74 is fixed to the sleeve 82 on a reduced portion 82a thereof below the jaw 40 and is provided at one end with a vertically fixed pin 76 which extends upwardly through a vertically disposed elongate hole 78 in the jaw 40, the axis of which is spaced from and parallel to the hole 70 and at the other end with a vertically disposed pin 53 which extends downwardly from the lower side on which there is mounted the cam follower 54. The biasing spring 50 is mounted on the sleeve bushing 82 above the jaw 40 with its lower end looped about a pin 41 (FIG. 2) fixed to the jaw 40 and its upper end fixed in a diametrical slot 83 at the upper end of the sleeve 82 which yieldably urges the jaw 40 in a counterclockwise direction. When the cam follower 54 is free of the cam plate 56 the spring 50 holds the pin 76 at the end 74a (FIG. 6) of the elongate hole 78. The additional counterclockwise movement of the arm 72 by engagement of the cam follower 54 with the cam 58 will move the pin 76 toward the end 74b of the elongate hole 78, increasing the torsional resistance to displacement of the spring 50 thus to more rigidly fix the position of the jar 40 and yet will permit displacement in the event of a badly deformed container without damage. The lower end of the sleeve 82 bears on the chain linkage.

The jaw 42 (FIG. 5) contains a vertical hole 84 and is mounted on a sleeve-like bushing 94 which in turn is mounted on an extension $x$. An arm 86 containing a vertically disposed hole 87 is fixed to the sleeve 94 on a reduced portion 94a thereof below the jaw 42 and is provided at one end with a vertically disposed pin 90 which extends upwardly through a vertically disposed, elongate hole 92 (FIG. 6) in the jaw 42, the axis of which is spaced from and parallel to the hole 84 and at its other end with a gear segment 102. The biasing spring 52 is mounted on the sleeve 94 above the jaw 42 with its lower end looped about a pin 43 (FIG. 2) fixed to the jaw and its upper end fixed in a diametrical slot 95 at the upper end of the sleeve 94 which yieldably urges the jaw 42 in a clockwise direction. The lower end of the sleeve 94 bears on the chain linkage. The spring 52 yieldably holds the pin 90 at the end 92a (FIG. 6) of the hole 92 and engagement of the follower 60 with the cam 64 will effect movement of the pin 90 toward the other end 92b of the hole to increase the torsional resistance to displacement of the spring thus to provide for stiff resistance to displacement, but at the same time to permit displacement in the event of a badly deformed container. A part 96 containing a vertical hole 98 is mounted on an extension $x$ of one of the pins adjacent the jaw embodying a pinion gear 103 which meahes with the gear sector 102 on the arm 86. An arm 106 (FIG. 6) provided with a split bushing 108 is fixed to the upper end of the part 98 above the pinion gear 103 by a screw bolt 110 and has at its other end a downwardly extending pin 112 on which there is mounted the cam follower 60.

It is clearly evident from the foregoing description that the jaws may be removed by the simply expedient of lifting them off the pin extensions as complete assemblies.

The aforementioned link 104 (FIGS. 2 and 6) which contains slots 104a and 104b is pivotally connected at one end to the jaw 42 of one pair of jaws by a pin 105a and at its other end to the jaw 40 of the other pair of jaws by a pin 105b and connects the pair of jaws while they travel along the rear side of the clamp-carrying conveyor while the cam follower rolls are out of engagement with the cam tracks.

The wheel 20, chain 32, conveyor 14 and belt 66 are driven in synchronism by kinematic means including shafts 114, 116, 118, 120, 122 and 124 and intermeshing gears illustrated diagrammatically in FIG. 6 driven by a motor M.

It should be understood that the present disclosure is for the purpose of illustration only and that this invention includes all modifications and equivalents falling within the scope of the appended claims.

We claim:

1. In combination with a container transporting conveyor having a horizontal straight run travelling in a predetermined direction, holding means above, parallel to and travelling in the same direction and at the same rate as the container transporting conveyor which holds containers on the container supporting conveyor at a predetermined spacing and in a predetermined orientation, clamping means for taking the containers from the holding means, and continuing movement thereof with the container transporting conveyor at said predetermined spacing and orientation, said clamping means comprising a clamp carrying conveyor, pairs of opposed pivotally mounted jaws on the clamp carrying conveyor, said jaws extending horizontally therefrom in a plane parallel to the plane of the container carrying conveyor, said clamp carrying conveyor having a straight run, curved end runs leading into and from the straight run and the return run, said clamp carrying conveyor being supported with the straight run underlapping the holding means and travelling in the same direction as the holding means so that pairs of clamps moved around the curved end leading into the straight run travel between the hold-down and the container conveyor, means synchronizing the movement of the several conveyors so that the clamps move into position for clamping of a container on the clamp carrying conveyor simultaneously with the arrival of a container at said position, cam means supporting the jaws of the clamp spread apart as they move around the curved end of the clamp carrying conveyor leading into the straight run so that the leading jaw is situated a predetermined position ahead of the container at said position and the trailing jaw a predetermined position behind the container, said cams being contoured so that as the jaws travel into the straight run the trailing jaw is first moved to a position of engagement with the rear side of the container, the leading jaw is then moved into engagement with the forward side of the container while the container is still held by said hold-down means, and means yieldably biasing each jaw on its support toward the other jaw.

2. Apparatus according to claim 1, comprising means associated with one of the jaws for maintaining the lateral position of a container clamped between the jaws.

3. Apparatus according to claim 1, comprising adapters adapted to be removably attached to said jaws for accommodating containers of different size and/or configuration.

4. In combination with a container transporting conveyor having a horizontal straight run travelling in a predetermined direction, holding means above, parallel to and travelling in the same direction and at the same rate as the container transporting conveyor which holds containers on the container supporting conveyor at a predetermined spacing and in a predetermined orientation, clamping means for taking the containers from the holding means, and continuing movement thereof with the container transporting conveyor at said predetermined spacing and orientation, said clamping means comprising a clamp carrying conveyor supported with a straight run above, parallel to and travelling in the same direction and at the same rate as the container transporting conveyor, said clamp carrying conveyor providing curved end runs and a return run connecting the end runs to the straight run, clamps on the clamp carrying conveyor comprising pairs of spaced confronting jaws, an arm pivotally supporting each jaw on the clamp carrying conveyor, a cam plate associated with the clamp carrying conveyor, a follower on each arm arranged to be moved by the clamp carrying conveyor into engagement with the cam plate so that as each pair of jaws moves around the end run into the path of movement of the containers on the container transporting conveyor, the leading one of the jaws moves to a position ahead of the container and the trailing one of the jaws moves to a position behind the container into clamping engagement with the container while the container is still held by said means, means pivotally mounting each jaw on its arm with a pin engaged within a slot and at a radial distance from the pivot such as to permit limited pivotal movement of the jaw on its arm, and means yieldably biasing each jaw comprising a spring biasing the jaw in a direction to hold the pin engaged with an end of the slot such that the jaw in its clamping position is permitted to yield by movement of the pin toward the opposite end of the slot.

* * * * *